United States Patent [19]

Ishikawa et al.

[11] Patent Number: 4,961,315
[45] Date of Patent: Oct. 9, 1990

[54] METHOD OF CONTROLLING SPEED REDUCTION RATIO OF CONTINUOUSLY VARIABLE SPEED TRANSMISSION

[75] Inventors: Yoshikazu Ishikawa; Kouji Yamaguchi, both of Saitama, Japan

[73] Assignee: Honda Giken Kogyo Kabushiki Kaisha, Tokyo, Japan

[21] Appl. No.: 251,567

[22] Filed: Sep. 30, 1988

[30] Foreign Application Priority Data

Oct. 12, 1987 [JP] Japan .................. 62-256715

[51] Int. Cl.$^5$ .............................. F16H 61/42
[52] U.S. Cl. ...................... 60/327; 60/431; 60/487; 74/844
[58] Field of Search .............. 180/307; 60/327, 431, 60/445, 448, 449, 459, 468–469, 487–489, 494; 74/866, 844; 364/424.1

[56] References Cited

U.S. PATENT DOCUMENTS

| 4,023,442 | 5/1977 | Woods et al. .................. 74/863 |
| 4,232,572 | 11/1980 | Ross ................................ 74/859 |
| 4,253,347 | 3/1981 | Mizuno ........................... 74/862 |
| 4,395,199 | 7/1983 | Izumi et al. ................... 60/449 X |
| 4,459,806 | 7/1984 | Falk ................................ 60/431 X |
| 4,507,986 | 4/1985 | Okamura et al. ............... 74/866 |
| 4,515,040 | 5/1985 | Takeuchi et al. .............. 74/866 |
| 4,523,892 | 6/1985 | Mitchell et al. .............. 60/449 X |
| 4,642,068 | 2/1987 | Osanai ............................ 474/11 |
| 4,701,853 | 10/1987 | Osanai ........................ 364/424.1 |
| 4,753,133 | 6/1988 | Itoh ................................ 74/866 |

FOREIGN PATENT DOCUMENTS

| 0168540 | 10/1986 | European Pat. Off. . |
| 0240178 | 10/1987 | European Pat. Off. . |
| 62-237164 | 10/1987 | Japan . |
| WO79/00036 | 2/1979 | PCT Int'l Appl. . |

Primary Examiner—Edward K. Look
Assistant Examiner—George Kapsalas
Attorney, Agent, or Firm—Lyon & Lyon

[57] ABSTRACT

A method of controlling a speed reduction ratio includes setting a reference engine speed in correspondence with an accelerator opening, measuring the atmospheric pressure, correcting the reference engine speed in correspondence with a change of the atmospheric pressure to compensate for a change in engine output power caused by the change of the atmospheric pressure, and controlling the speed reduction ratio so that the engine speed coincides with the corrected reference engine speed.

14 Claims, 4 Drawing Sheets

METHOD OF CONTROLLING SPEED REDUCTION RATIO OF CONTINUOUSLY VARIABLE SPEED TRANSMISSION

BACKGROUND OF THE INVENTION

The invention relates to a method of controlling a speed reduction ratio of a continuously variable speed transmission.

As a measure for controlling the speed of a vehicle equipped with a continuously variable speed transmission by controlling the speed reduction ratio thereof, there has been known a method in which the engine speed is matched with the reference engine speed set in correspondence to the throttle opening of the engine (see, for example, Japanese Patent Laid-Open Publication No. 62(1987)-237164.

In these methods where the engine speed is controlled to match the reference engine speed, the engine output power, and hence the driving power, diminishes, though the engine speed is maintained constant, in a region of low atmospheric pressure such as high altitude regions, and as a result driver feels the driving unenjoyable.

SUMMARY OF THE INVENTION

The invention is directed to providing ratio control method that can ensure a good driving feeling without being affected by the change in the output power of an engine due to a change in the atmospheric pressure.

The invention is also directed to providing a speed control method for improving the power shortage encountered in, for example, driving under low atmospheric pressure.

In order to accomplish these objects, the invention utilizes the measurement of the atmospheric pressure to compensate the change in engine output power caused by the change in atmospheric pressure by correcting the engine speed in accordance with the detected change in the pressure, if any, since the engine speed is controlled by controlling the speed reduction ratio {i=(input speed of transmission)/(output speed of transmission)} so as to coincide with the reference engine speed corresponding to the throttle opening of the engine.

With such a speed control method, even in a high altitude region, for example, where the atmospheric pressure is low, the reference engine speed is increased in correspondence with the opening of the engine throttle so that the decrease or the drop of the engine speed caused by the drop of the engine output can be avoided, thereby ensuring a good driving feeling.

The wordings "accelerator opening" used in the specification and claims means an accelerator pedal opening operated dependent upon the driver's intention of accelerating or decelerating or an engine throttle value opening responsive to the operation of accelerator pedal. The accelerator opening is fully closed when the accelerator pedal is completely released and fully opened when it is completely depressed.

Further scope and applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawings which are given by way of illustration only, and thus do not limit the scope of the present invention. Wherein.

DESCRIPTION OF THE PREFERRED EMBODIMENTS

Figure 1:
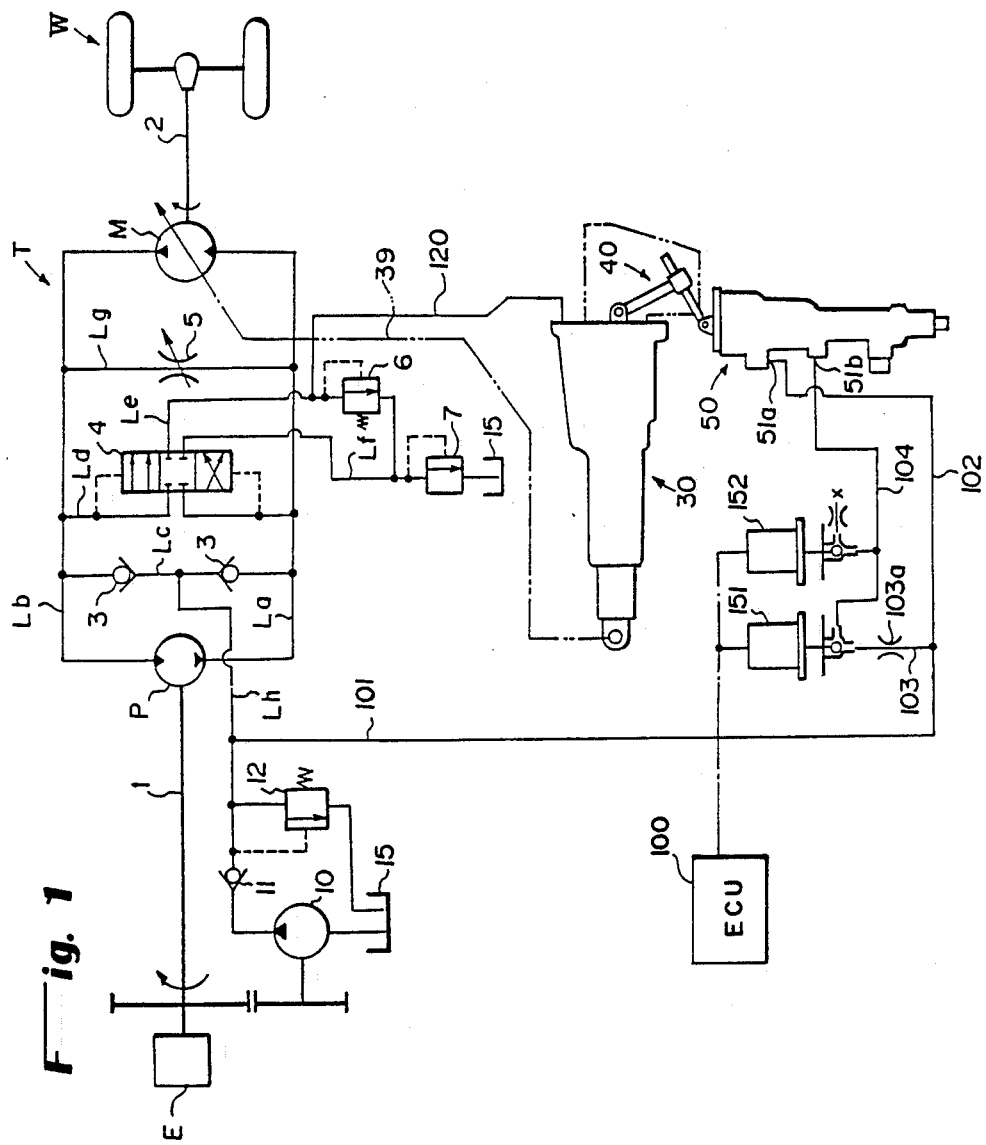
FIG. 1 is a hydraulic circuit diagram of the continuously variable speed transmission to be controlled by the method according to the invention.

FIG. 1 shows a hydraulic circuit diagram of a continuously variable speed transmission according to the invention. The continuously variable speed transmission has a constant displacement hydraulic pump P driven by the engine E through the input shaft 1 and a variable displacement hydraulic motor M connected to the output shaft 2 driving the wheels W. The hydraulic pump P and motor M constitute a closed hydraulic circuit along with two hydraulic lines: the first hydraulic line La by which the delivery port of the pump P communicates with the suction port of the motor M, and the second hydraulic line Lb by which the suction port of the pump P communicate with the delivery port of the motor M.

A charge pump 10 driven by the engine E is connected to the closed circuit throught a charge hydraulic line Lh having a check valve 11 and through a third hydraulic line Lc having a pair of check valves 3 and 3. Hydraulic oil pumped up by the charge pump 10 from an oil sump 15 and regulated in its pressure by a charge pressure relief valve 12 is supplied to either of the two hydraulic lines La or Lb which has a lower pressure through the check valves 3, 3. A fourth hydraulic line Ld having a shuttle valve 4 is connected to the closed circuit. To the shuttle valve 4 is connected a fifth hydraulic line Le and a Lf which respectively have a high pressure relief valve 6 and a low pressure relief valve 7 and are connected to the oil sump 15. The shuttle valve 4 is a 2-port 3-postion selector valve, which is operated in response to a hydraulic pressure difference between the first and second hydraulic lines to connect either of the first or second hydraulic lines La, Lb having a higher pressure to the fifth hydraulic line Le as well as to connect the other of the first and second hydraulic lines having a lower pressure to the sixth hydraulic line Lf. Therefore, the relief pressure of the higher pressure line is regulated by the high pressure relief valve 6, and the relief hydraulic pressure of the other, lower pressure line is regulated by the low pressure relief valve 7.

Between the first and second hydraulic lines La and Lb is provided a seventh hydraulic line Lg to short-circuit the closed hydraulic circuit, that is, short-cut the both two lines. The seventh hydraulic line Lg is provided with a clutch valve 5, a variable opening control valve, to control the opening degree of the line. Therefore, the throttle control of the clutch valve 5 can effect clutch control to control the transmission of driving force from the hydraulic pump P to the hydraulic motor M.

Actuators for displacement control of the hydraulic motor M to control the speed reduction ratio of the continuously variable speed transmission T are a first ratio control servo unit 30 and a second ratio control servo unit 50 which are connected with each other by means of a link mechanism 40. The hydraulic motor M is of a swash plate axial piston type, and its displacement is changed by the control of swash the plate angle by means of the ratio control servo units 30, 50.

The operation of the ratio control servo units 30, 50 is controlled by solenoid valves 151, 152 which are duty-ratio-controlled by signals from a controller 100. The controller 100 receives signals corresponding to the vehicle speed V, the engine speed Ne, a throttle opening $\theta$th, a swash plate slant angle $\theta$tr of the hydraulic motor M, an accelerator pedal opening $\theta$acc operated by the driver, and the atmospheric pressure Pat. Based on these signals, the controller 100 outputs signals for controlling the solenoid valves 151, 152 so as to effectuate desirable vehicle traveling control.

Figure 2:
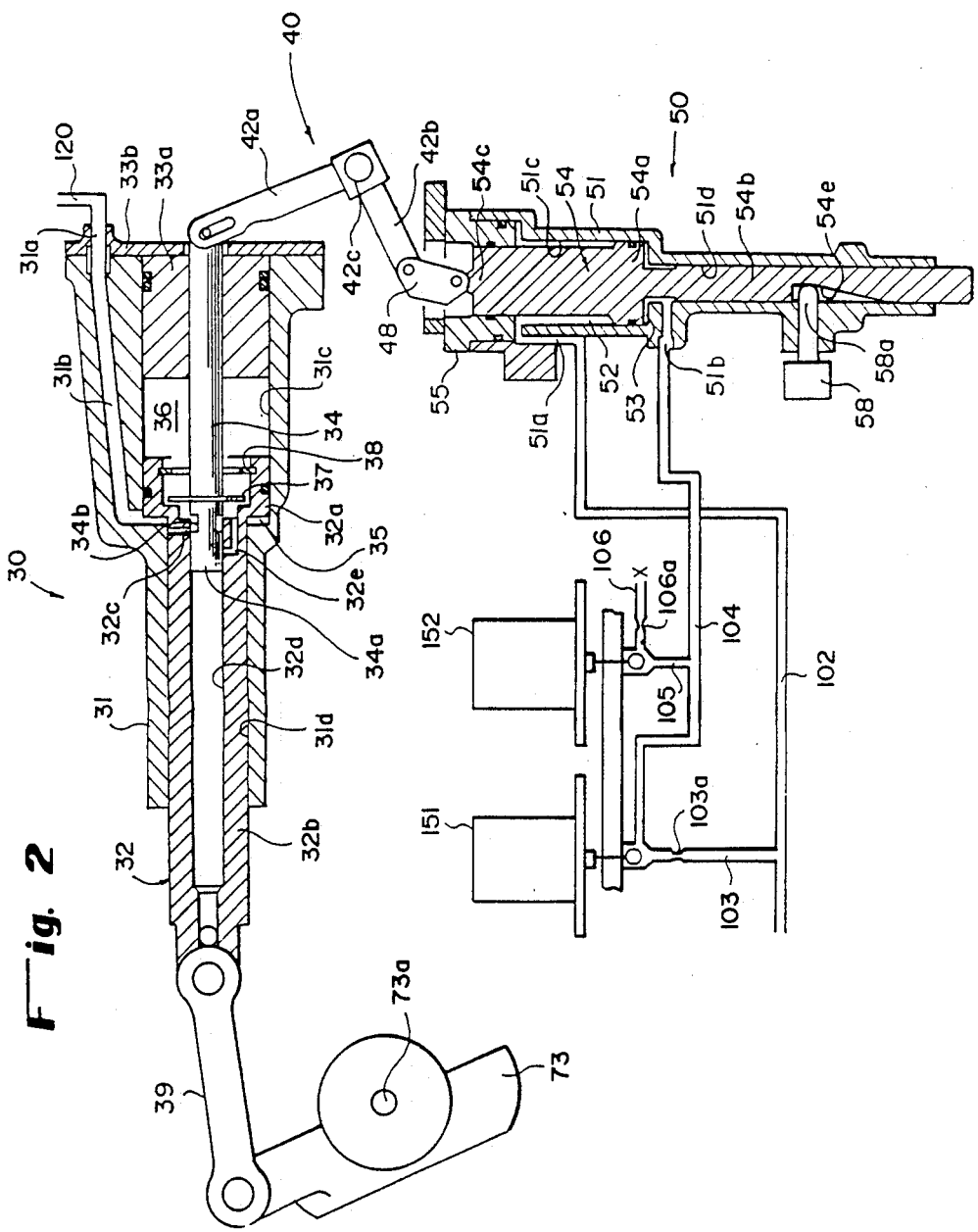
FIG. 2 illustrates cross sectional views of a first and a second speed control servo valve.

The structures and operations of the servo units 30, 50 are described in detail below based on FIGS. 1 and 2.

The first ratio control servo unit 30 controls the swash plate angle of the hydraulic motor M with the help of the high hydraulic pressure fed from the closed hydraulic circuit of the transmission T through the shuttle valve 4, the fifth line Le and a high pressure line 120. The second ratio control servo unit 50 is connected to the first ratio control servo unit 30 by a link mechanism 40 and controls the operation of the first ratio control servo unit 30.

The first ratio control servo unit 30 comprises a housing 31 having a connection port 31a connected to the high pressure line 120, a piston member 32 slidably inserted into the housing 31, and a spool member 34 slidably and coaxially inserted into the piston member 32. The piston member 32 consists of a piston portion 32a formed at its right and a rod portion 32b coaxially extending leftward. The piston portion 32a is fitted into a cylinder hole 31c of the housing 31 and divides the space inside the cylinder hole 31c into two chambers defining two cylinder chambers 35, 36. The rod portion 32b having a smaller diameter than that of the cylinder hole 31c is inserted into a rod hole 31d which is concentric with the cylinder hole 31c. The right cylinder chamber 36 is covered by a plug member 33a and cover 33b through which the right end of the spool member 34 protrudes.

A high pressure line 120 connected to the port 31a communicates with the left cylinder chamber 35 through a hydraulic line 31b. The piston member 32 is pushed rightward by the hydraulic pressure fed in the left cylinder chamber 35 through the high pressure line 120.

A land portion 34a which is inserted in a spool hole 32d is formed at the left end of the spool member 34. A pair of dents 34b having diagonal planes with fixed axial widths is formed at the right side of the land portion 34a. A stop ring 37 mounted on the spool member 34 hits against a stop ring 38 mounted on the inside surface of the piston member 32 before the spool member 34 comes out.

A drain passage 32e which can connect the right cylinder chamber 36 to the oil sump (not shown) through the spool hole 32d responding to the rightward motion of the spool member 34, and a connection passage 32c which can connect the left cylinder chamber 35 to the right cylinder chamber 36 through the dents 34b responding to the leftward motion of the spool member 34, are formed in the piston member 32.

When the spool member 34 is moved rightward, the land portion 34a blocks the connection passage 32c and opens the drain passage 32e. Accordingly the hydraulic pressure fed through the high pressure line 120 is fed into left cylinder chamber 35 and pushes the piston member 32 rightward so that the piston member 32 follows the spool member 34. When the spool member 34 is moved leftward, the connection passage 32c communicates with the right cylinder chamber 36 through the dents 34b and the drain passage 32e is blocked by the land portion 34a. Accordingly the high hydraulic pressure is fed to both the left and right cylinder chambers 35, 36. The piston member 32 is pushed leftward because of the difference in areas where the pressure is applied and therefore the piston member 32 is moved so as to follow the spool member 34.

When the spool member 34 is held still, the piston member 32 is also held still creating a hydraulic floating state because of pressure balance between the left and right cylinder chambers 35, 36.

As aforesaid, when the spool member 34 is moved leftward or rightward, the piston member 32 is moved laterally so as to follow the spool member 34 with the help of the high hydraulic pressure fed through the high pressure line 120. Accordingly, the variable displacement of the motor M is controlled by the motion of the spool member 34 since the piston member 32 is connected to the swash plate 73 of the motor M by means of a link member 39.

The spool member 34 is linked to the second servo unit 50 by means of a link mechanism 40. The link mechanism 40 includes a first link member 42 being swingable around an axis 42c and having two arms 42a and 42b perpendicular to each other, and a second link member 48 pivotally connected to the arm 42b. The upper end of the arm 42a is pivotally connected to the right end of the spool member 34. The bottom end of the second link member 48 is pivotally connected to a spool member 54 of the second servo unit 50. Therefore when the spool member 54 of the second servo unit 50 is moved up or down, the spool member 34 of the first servo unit 30 is moved rightward or leftward.

The second servo unit 50 comprises a housing 51 having ports 51a, 51b to which hydraulic lines 102, 104 are connected, respectively, and the spool member 54 vertically slidably fitted in the housing 51. The spool member 54 consists of a piston portion 54a, and end spool portion 54b coaxially extending downward and a rod portion 54c coaxially extending upward therefrom. The piston portion 54a is inserted into a cylinder hole 51c of the housing 51 and divides the space inside the cylinder hole 51c covered by a cover 55 into two chambers defining a upper and a lower cylinder chamber 52, 53. The end spool portion 54b is inserted into a rod hole 51d which is concentric with the cylinder hole 51c and extends downward.

A spool 58a of a top position detecting switch 58 is projected into a recess 54e formed on the end spool portion 54b. The spool 58a is pushed up along the tapered surface of the recess 54e when the spool member 54 is moved up. Therefore it can be found by the top postion detecting switch 58a if the speed reduction ratio has become minimum since the pushed-up spool 58a turns the switch 58 on.

Further, the hydraulic lines 102, 104 are communicated with the upper and lower cylinder chambers 52, 53 through the ports 51a, 51b. The spool member 54 is moved up or down by the difference in hydraulic forces applied to the piston portion 54a, which hydraulic forces are determined based on the differences of hydraulic pressures and areas where the hydraulic pressures in the cylinder chambers 52, 53 are applied. The up and down motions of the spool member 54 are transmitted to the spool member 34 of the first servo unit 30 by the link mechanism 40 causing right and left motions of the spool member 34. In other words, the control of the hydraulic pressures supplied through the hydraulic lines 102, 104 enables control of the motion of the spool member 34 and the piston member 32 in the first servo unit 30 and also enables control of the swash plate angle of the hydraulic motor M and the displacement thereof. In fact, when the spool member 54 of the second servo unit 50 is moved up, the piston member 32 of the first servo unit 30 is moved rightward lessening the swash plate angle, the displacement of the hydraulic motor M and the speed reduction ratio.

The pressurized oil in the hydraulic line 102 connecting the port 51a with the upper cylinder chamber 52 is sent through a hydraulic line 101 and 102 from the delivery line of the charge pump 10 after its pressure is regulated by the charge pressure relief valve 12. The oil pressure in the hydraulic line 104 connecting the port 51b with the lower cylinder chamber 53 is obtained by regulating the oil pressure in a hydraulic line 103 (including an orifice 103a therein), which is branched from the hydraulic line 102, by the first and second duty-ratio-controlled solenoid valves 151 and 152. The first solenoid valve 151 duty-ratio-controls the flow rate of the oil flowing from the hydraulic line 103 (having the orifice 103a therein) to the hydraulic line 104. The second solenoid valve 152 is disposed between a hydraulic line 105 branched from the line 104 and a hydraulic line 106 communicating with the drain through an orifice 106a, and duty-ratio-controls a drain-flow of the hydraulic oil from the line 104 in accordance with a given duty ratio.

As a result, to the upper cylinder chamber 52 a charge pressure regulated by the charge pressure relief valve 12 is applied through the line 102, while to the lower cylinder chamber 53 is supplied from the line 104 a lower pressure than the charge pressure which is regulated by the first and second solenoid valves 151 and 152. In this connection, since the pressure applied area of the upper cylinder chamber 52 is smaller than that of the lower cylinder chamber 53, the forces of oil pressures in the cylinder chambers 52 and 53 acting on the spool member 54 keep their balance when the oil pressure in the lower cylinder chamber 53 is a specified value P1 which is smaller than the oil pressure Pu in the upper cylinder chamber 52 (Pu>P1). Therefore, when the oil pressure supplied into the lower cylinder chamber 53 from the line 104 is controlled by the first and second solenoid valves 151 and 152 so as to be higher than the above pressure P1, the spool member 54 is moved upward to yield a small swash plate angle of the hydraulic motor M, i.e., to yield a small speed reduction ration, while when the oil pressure supplied into the lower cylinder chamber 53 from the line 104 is controlled so as to be smaller than the above pressure P1, the spool member 54 is moved downward to yield a relatively large swash plate angle of the hydraulic motor M, i.e., to yield a relatively large speed reduction ratio.

The two solenoid valves 151 and 152 are controlled by signals from the controller 100: only by controlling the operations of the two solenoid valves 151 and 152 based on the signals from the controller 100, the actuations of the first and second ratio control servo units 30 and 50 are controlled, which results in the control of the displacement of the hydraulic motor M, and the control of the speed reduction ratio.

Figure 3:
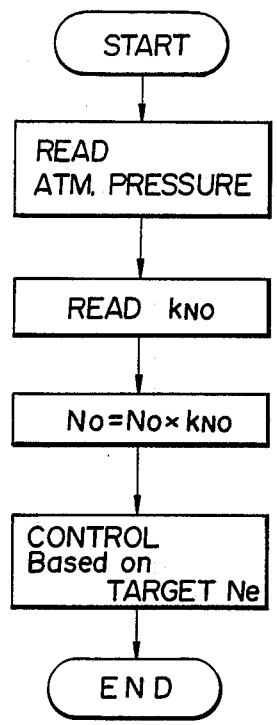
FIGS. 3 and 6 are flow-charts illustrating the content of the ratio control method referred to above.

Referring to FIG. 3, the control of the speed reduction ratio by means of the controller 100 is now described.

In this control, the atmospheric pressure is first read out by means of an atmospheric sensor, for which the correction factor $K_{no}$ equals 1.0 for the standard atmospheric pressure (1 atm), and becomes greate*r as the atmospheric pressure becomes low. Second, the reference engine speed $N_o$ in accordance with the opening of the engine throttle is read in and the reference engine speed $N_o$ is corrected by multipyling it by the correction factor $K_{no}$. Next a speed control operation is conducted so that the actual engine speed coincides with this corrected reference engine speed.

Figure 5:
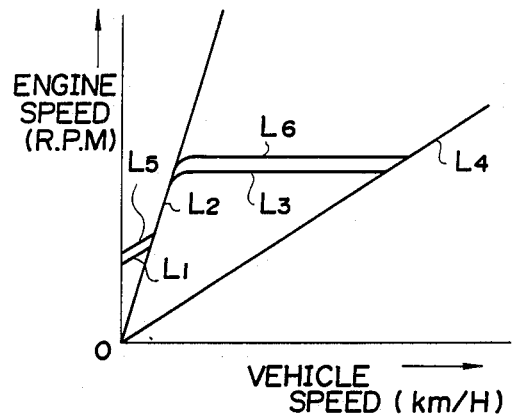
FIG. 5 is a graph illustrating the driving characteristics of a vehicle equipped with a continuously variable speed transmission controlled as mentioned above.
Figure 4:
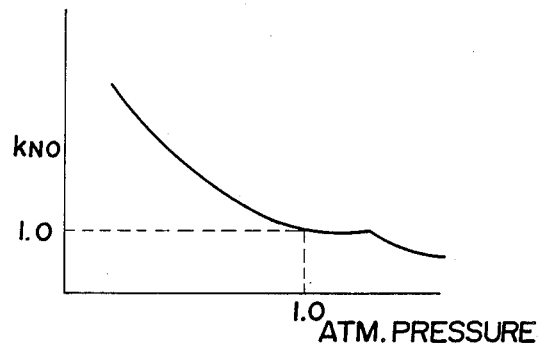
FIG. 4 is a graph showing the relationship between atmospheric pressure and a correction factor for reference engine speed.

Referring to FIG. 5, starting and driving characteristics will be described below. As the accelerator pedal is depressed to make the throttle opening larger to raise engine speed, a control operation is carried out following the engagement of the main clutch so as to increase the actual engine speed while keeping the engine speed matched with the reference speed corresponding to the throttle opening. When, for example, the atmospheric pressure is the standard pressure (1 atm), the speed control results in the following sequential steps for changing the vehicular speed:

L1 (main clutch engagement) to L2 (increase in vehicular speed due to the increase in engine speed at the maximum speed reduction ratio) to L3 (increase in vehicular speed by decreasing speed reduction ratio under constant engine speed) to L4 (increase in vehicular speed due to the increase in engine speed at the minimum speed reduction ratio). In contrast, when driving in a high altitude region where the atmospheric pressure is low, the reference engine speed $N_o$ is corrected to a higher value, resulting in a higher engine speed (than normal) to compensate the drop in the engine output due to the pressure drop, the mode of the speed control therefor being L5 to L2 to L6 to L4 as shown in the Figure.

Consequently, with such a speed control as described above, the output driving force of a continuously variable speed transmission is prevented from dropping and drivng feeling is kept unchanged due to the raising correction of the reference engine speed, even when the atmospheric pressure is low (as in high altitude driving).

Incidentally, the compensation for the drop in engine output power due to the atmospheric pressure change is possible also by correcting the reference manifold pressure of the engine. This type of speed control is now described below.

Figure 6:
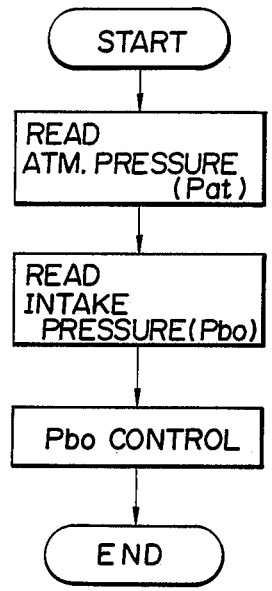
Figure 7:
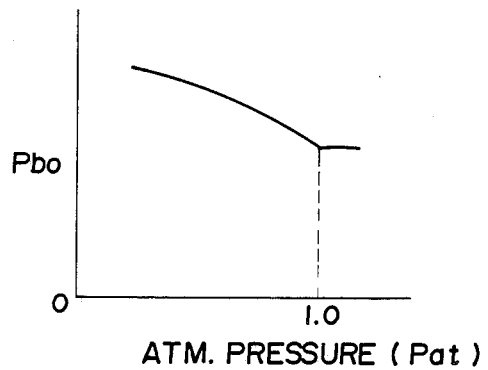
FIG. 7 is a graph showing the relationship between atmospheric pressure and a reference manifold pressure.

As shown in FIG. 6, as the atmospheric pressure is read out, reference manifold pressure $P_{bo}$ is determined from the data shown in FIG. 7, and speed control is given so as to make the engine manifold pressure which with the reference manifold pressure $P_{bo}$. As the atmospheric pressure $P_{at}$ drops, the reference manifold pressure $P_{bo}$ will be increased in response to the pressure drop so that the resulting drop in engine output power is compensated, preventing the driving feeling from being deteriorated.

Although in the example above the invention is described in connection with a continuously variable speed transmission comprising a hydraulic pump and hydraulic motor, the invention can obviously be used with other types of continuously variable speed transmissions. Furthermore, the invention can be used equally well such systems where servo units are operated as a means for controlling the speed reduction ratio by hydraulic pressure generated in correspondence with the openings of the throttles, and is not limited to electro-hydraulic systems where solenoid valves are controlled by means of electric controllers to actuate servo units as in the above example.

As described above, since the reference engine speed corresponding to the throttle opening is raised in correspondence with the atmospheric pressure drop, the engine output power that will be otherwise dropped by the atmospheric pressure change is compensated, to thereby maintain good driving feeling even while driving in a region of low atmospheric pressure (e.g., in high altitude regions).

The invention being thus described, it will be obvious that the same may be varied in many ways. Such variations are not to be regarded as a departure from the spirt and scope of the invention, and all such modifications as would be obvious to one skilled in the art are intended to be included within the scope of the following claims.

What is claimed is:

1. A method of controlling a speed reduction ratio of a continuously variable speed transmission comprising the steps of:
   setting a reference engine speed in correspondence with an accelerator opening which is indicative of the driver's intention of acceleration and deceleration;
   measuring atmospheric pressure;
   correcting said reference engine speed in correspondence with a change of atmospheric pressure to compensate a change in engine output power caused by the change of said atmospheric pressure; and
   controlling the speed reduction ratio so that the engine speed coincides with the corrected reference engine speed.

2. A method of controlling a speed reduction ratio according to claim 1, wherein, when correcting said reference engine speed, said reference engine speed is increased in correspondence with a decrease of the atmospheric pressure so as to compensate for a decrease in engine output power due to the atmospheric pressure decrease.

3. A method of controlling speed reduction ratio according to claim 1 or 2, wherein said continuously variable speed transmission comprises a hydraulic pump driven by an engine and a hydraulic motor driven by hydraulic pressure supplied by said hydraulic pump, at least one of said pump and motor being of a variable displacement type, and wherein the reduction ratio can be determined through variable displacement control.

4. A method of controlling a speed reduction ratio of a continuously variable transmission in a vehicle with an engine, comprising the steps of
   setting a reference engine according to a driver's intention of acceleration or decelertion,
   measuring an atmospheric pressure,
   correcting said reference engine speed according to said atmospheric pressure, and
   controlling said speed reduction ratio so that an actual engine speed of said engine matches said corrected reference engine speed.

5. A method of controlling a speed reduction ratio according to claim 4, wherein said step of correcting said reference engine speed comprises the substeps of
   comparing said atmospheric pressure with a reference pressure, and
   increasing said reference engine speed if said atmospheric pressure is less than said reference pressure.

6. A method of controlling a speed reduction ratio according to claim 5, wherein said reference pressure is a standard atmospheric pressure.

7. A method of controlling a speed reduction ratio according to claim 4, wherein during said step of correcting said reference engine speed, if a standard atmospheric pressure exceeds said atmospheric pressure, then said reference engine speed is increased an amount corresponding to a difference between said standard atmospheric pressure and said atmospheric pressure.

8. A method of controlling a speed reduction ratio of a continuously variable transmission in a vehicle with an engine, said transmission having a hydraulic pump driven by said engine and a hydraulic motor, said hydraulic pump and said hydraulic motor being interconnected by a closed hydraulic circuit, at least one of said hydraulic pump and said hydraulic motor being of a variable displacement type, comprising the steps of
   setting a reference engine speed according to a driver's intention of acceleration or deceleration,
   measuring an atmospheric pressure,
   correcting said reference engine speed according to said atmospheric pressure, and
   controlling said speed reduction ratio by varying the capacity of said one of said hydraulic pump and said hydraulic motor which is of a variable displacement type, so that an actual engine speed of said engine matches said corrected reference engine speed.

9. A method of controlling a speed reduction ratio of a continuously variable transmission in a vehicle, said transmission being driven by an engine, comprising the steps of
   determining an atmospheric pressure,
   comparing said atmospheric pressure with a reference pressure,
   determining a correction factor according to a difference between said atmospheric pressure and said reference pressure,
   determining a reference engine speed according to a driver's intention of acceleration or deceleration, as indicated by an opening of an engine throttle,
   determining a corrected reference engine speed according to said correction factor, and
   controlling said speed reduction ratio as necessary to adjust an actual speed of said engine to match said corrected reference engine speed.

10. A method of controlling a speed reduction ratio of a continuously variable transmission in a vehicle, said transmission being driven by an engine, comprising the steps of determining an atmospheric pressure, comparing said atmospheric pressure with a reference pressure, determining a correction factor according to a difference between said atmospheric pressure and said reference pressure, determining a reference engine speed according to a driver's intention of acceleration or deceleration, as indicated by an opening of an engine throttle.

determining a corrected reference engine speed according to said correction factor, by multiplying said reference engine speed by said correction factor, and controlling said speed reduction ratio as necessary to adjust an actual speed of said engine to match said corrected reference engine speed.

11. A method of controlling a speed reduction ratio according to claim 10, wherein said correction factor varies with the difference between said atmospheric pressure and said reference pressure, and said correction factor is greater than one if said atmospheric pressure is less than said reference pressure.

12. A method of controlling a speed reduction ratio according to claim 11, wherein said reference pressure is a standard atmosphere.

13. A method of controlling a speed reduction ratio of a continously variable transmission in a vehicle with an engine, comprising the steps of determining at atmospheric pressure, determining a reference manifold pressure of said engine based on said atmospheric pressure, and controlling said speed reduction ratio as necessary to adjust an actual manifold pressure of said engine to match said reference manifold pressure.

14. A method of controlling a speed reduction ratio according to claim 13, wherein said reference manifold pressure drops as said atmospheric pressure drops.

* * * * *